3,108,402
PRODUCTION OF CAROTENOID PIGMENTS
Henry R. Kathrein, Muscatine, Iowa, assignor to Grain Processing Corporation, Muscatine, Iowa, a corporation of Iowa
No Drawing. Filed Mar. 16, 1961, Ser. No. 96,095
16 Claims. (Cl. 47—58)

This invention relates to methods of producing carotenoids and more specifically to improved methods for the production of beta-carotene and xanthophyll by the cultivation of a "grass green" alga of the botanical division Chlorophyta, and particularly to methods involving the cultivation of algae under heterotrophic conditions in an aqueous nutrient medium.

Carotenoid pigments are useful in supplementing animal diets both as a source of beta-carotene for poultry, cattle and hogs, and xanthophyll for poultry.

Generally it has been known that algae and particularly algae of the genus Chlorella may be propagated under mass culture conditions using a synthetic nutrient medium. These cultures were carried out under autotrophic conditions requiring a source of carbon dioxide and maximum light conditions for favorable growth. In other instances, cultivation of algae has been carried out in an organic nutrient medium using an inorganic nitrogen source, such as potassium nitrate under heterotrophic conditions. Carotene and xanthophyll were produced in low yield both in the presence of light and in darkness.

In my Patent No. 2,949,700, issued August 23, 1960, a process is disclosed for producing carotenoids from algae under heterotrophic conditions from an organic nutrient medium containing urea. The present invention relates to certain improvements in the process disclosed in said patent which result in improved yields of beta-carotene and xanthophyll.

It has been found that enhanced yields of the carotenoids beta-carotene and xanthophyll may be obtained by carefully regulating the initial concentration of carbohydrate in the nutrient medium and adding supplementary carbohydrate during the fermentation process to maintain the concentration thereof within certain predetermined limits. By utilizing this procedure it has been found that large amounts of carbohydrate may be assimilated by the algae during the fermentation (cultivation) period and the yield of beta-carotene and xanthophyll considerably enhanced. If the total amount of carbohydrate utilized in the cultivation of algae in this manner were added at one time at the initiation of the process, the result would be to inhibit the growth of algae and thereby reduce the yield of carotenoids produced.

It has also been found that further improvements may be had in yield of carotenoid pigments by supplementary feeding of a proteinaceous material and/or urea during the cultivation or growth period in the manner described with respect to carbohydrates.

Accordingly, in one broad form the present invention includes a process for the production of carotenoids by the cultivation under heterotrophic conditions of a green alga of the division Chlorophyta in an aqueous organic nutrient medium comprising a proteinaceous material, urea, and an initial concentration of up to about 9 percent by weight (dry basis) of carbohydrate, said process being further characterized in the further addition of carbohydrate to said nutrient medium during the cultivation to maintain the concentration thereof at from about 0.5 to about 6.5 percent by weight (dry basis).

Still another embodiment of the present invention is a process of producing carotenoids by the cultivation of algae as described above wherein supplementary proteinaceous material is added to the nutrient medium during the cultivation to maintain the concentration thereof at from about 0.1 to about 1.5 percent by weight (dry basis).

While the present process broadly includes algae of the division Chlorophyta, it is a preferred procedure to use an alga of the order Chlorococcales, family Oöcystaceae, and genus Chlorococcum, Spongiochloris, Spongiococcum, Chlorella or Coccomyxa. Of the genus Chlorella the most preferred species are *vulgaris* and *pyrenoidosa*, and of the genus Spongiochloris, the species *multisporis* is the most preferred. A preferred species of the genus Spongiococcum is *excentricum*, and of the genus Coccomyxa the preferred species is *elongata*.

The carbohydrate portion of the nutrient may be any assimilable starch or sugar, such as glucose, dextrin, mannose, sorbose, dextrose, arabinose, xylose, levulose, lactose, cellobiose, and maltose, rhamnose, raffinose and the like.

The aggregate amount of carbohydrate utilized will vary from about 4 percent to about 30 percent, or preferably from about 4 up to about 15 percent. Generally the initial concentration of carbohydrate at the initiation of the fermentation or cultivation procedure should be up to about 9 percent by weight (dry basis) and a lower limit on the same basis of about 0.5 percent. Preferably the initial concentration of carbohydrate should be from about 0.5 to about 6 percent on a dry weight basis, and as a most preferred range from about 0.5 to about 4 percent on a dry weight basis. As indicated in the foregoing, enhanced yields of carotenoids are obtained by the further addition of carbohydrate to the nutrient medium during the cultivation or fermentation period. The amounts of carbohydrate which are added are variable; however, the concentration of carbohydrate should be maintained broadly within the range of from about 0.5 to 6 percent by weight (dry basis) and preferably from about 0.5 to about 5 percent on a dry weight basis. In carrying out this process the supplementary carbohydrate may be added when the carbohydrate in the nutrient medium is depleted below the 4 percent level, that is in the range of from about 0.5 to 4 percent. The feeding interval, while adjusted primarily from the point of view of the rate of utilization, is in practice at intervals of one or two days, although with proper equipment carbohydrate may be added to the fermentation mass continuously throughout the process.

The protein nutrient is preferably a water soluble proteinaceous material, such as, for example, distiller's solubles syrup, soy albumin, lactalbumin, beef extract, whey, yeast hydrolyzate, casein hydrolysate, corn steep liquor, enzymatically degraded collagenous material, or peptones in general.

The aggregate proteinaceous material is utilized in the nutrient medium in an amount of from about 0.1 to 5 percent calculated on a dry weight basis and preferably from about 0.4 to about 2.4 percent by weight. In those instances wherein supplementary proteinaceous material is fed to the nutrient medium during the cultivation period the concentration thereof is maintained in the medium at from about 0.1 to about 1.5 percent by weight (dry basis) and preferably at from 0.25 to 0.75 percent on the same basis. The ratio of proteinaceous material to carbohydrate should be in the range of from 0.25 to 0.8 weight percent for each 1 percent of carbohydrate, on a dry weight basis, both in the case where supplementary feeding of proteinaceous material is carried out and also where it is not utilized.

Urea is used in amounts ranging from about 0.05 to about 4 weight percent, a most preferred range being from about 0.2 to about 2.0 weight percent. Generally, the urea should be present in the nutrient in an amount corresponding to from 0.02 to 0.2 percent for each 1 percent of carbohydrate (dry basis), although as high as 0.4 percent also produces satisfactory results.

The process of the present invention is preferably carried out at temperatures of from about 20° to about 35° C., but temperatures of from 10° to 40° C. are also employed with good results. The most optimum temperature appears to be about 28° C. for the production of xanthophyll. As indicated above, the fermentation or cultivation may be conducted in the complete absence of light and in the absence of carbon dioxide, namely heterotrophic conditions. The pH does not appear to be a critical factor, and accordingly the initial pH of the medium may range from as low as 5.4 to as high as 9, a pH of from about 6.6 to 6.8 being optimum. The length of time which is required for the production of good yields of beta-carotene and xanthophyll by the cultivation of algae may range from about five to about fifteen days; however, under optimum conditions maximum growth is attained in from about six to seven or eight days. Generally for most economical operation a period of from six to ten days will produce adequate yields of carotenoids from an economical viewpoint.

While the process of the invention is carried out under heterotrophic conditions, it is preferably with accompanying aeration and agitation. It should be noted that high illumination, as is the case under autotrophic conditions, is not necessary in this process, and good yields of carotenoids are obtained in the absence of light.

It should also be understood that while the foregoing description sets forth the basic nutrients to be utilized in the process of this invention, it is also a part hereof to include the necessary micronutrients and trace elements (which are well known to those skilled in this art) and which are required for proper proliferation and growth of the algae.

A clearer understanding of this invention may be had by reference to the following specific examples showing the production of beta-carotene and xanthophyll by processes of the present invention.

PREPARATION OF INOCULUM

The stock cultures of algae were maintained on a medium containing dextrose (1.0%), malt extract (0.3%), yeast extract (0.3%), Bacto peptone (0.5%), corn steep liquor (1.0%) and agar (1.5%). A loopful of a three or four day old culture was taken from the above solid medium and transferred to a test tube containing 7 milliliters of the same medium without the agar. The test tube was agitated three to four days on a reciprocating shaker. The contents of this tube were then transferred to 100 milliliters of medium containing dextrose (3.0%), corn steep liquor (1.5%) and urea (0.3%) in a 500-milliliter Erlenmeyer flask. The flask was allowed to agitate three to four days on a reciprocal or rotary shaker.

The medium employed for the culturing of algae contained a carbohydrate source, in this case dextrose, at levels from 3.0 to 6.0 percent. Corn steep liquor was the main source of nitrogen at levels of 1.0 to 2.0 percent supplemented with urea at levels of 0.3 to 1.0 percent. The medium was adjusted to predetermined pH dependent upon the amount of dextrose, corn steep liquor and urea level employed. 100 milliliters of the medium was measured into 500-milliliter Erlenmeyer flasks and the flasks sterilized 45 minutes at 121° C. After cooling, the urea was added aseptically to the individual flasks and the flasks were then inoculated with the above described inoculum. The flasks were aerated and agitated on a reciprocating or rotary shaker in a walk-in incubator adjusted to 28° C. At predetermined intervals the flasks were removed from the shaker and additional amounts of sterilized dextrose solution added aseptically to the flasks. Flasks were then put back on the shaker to finish out the growth period of seven to nine days. Carotene and xanthophyll content of the resulting algae cells was determined by a procedure of Bickoff, E. M., Livingston, A. L., Bailey, G. F., and Thompson, C. R. J.A.O.A.C. 37: 894 (1954).

The following specific examples are illustrative of the procedure described.

*Example 1*

A series of culture media was made up containing 2.0, 3.0, 4.0, 5.0, 6.0, 9.0 and 12.0 percent dextrose as carbohydrate source, and 1.5 to 3.5 percent corn steep liquor as nitrogen source. As an additional nitrogen source, 0.3 to 0.4 percent urea was added to all flasks after sterilization. The media were adjusted to pH 6.8 and duplicate flasks of 100 milliliters per 500-milliliter flask of each medium were prepared. After sterilization for 35 minutes at 121° C., urea was added and the flasks inoculated with 3.0 percent by volume of a six-day liquid culture of *Spongiococcum excentricum*. The flasks were placed on a rotary shaker for aeration and agitation at 28° C. One group of flasks containing 2.0, 3.0, 4.0, 5.0, 6.0, 9.0 and 12.0 percent dextrose was incubated the entire nine-day growth period with no supplemental dextrose. The remainder of the flasks were supplemented with 2.0 to 9.0 percent dextrose and from 1.0 to 2.0 percent corn steep liquor at various intervals to maintain the concentration of carbohydrate at a level of from 0.5 to 4 percent on a dry weight basis. All fermentations were terminated at nine days. Carotene and xanthophyll determinations made on the centrifuged cells are shown in Table 1.

TABLE I

[The effect of feeding dextrose to the medium during the fermentation period upon carotenoid production by alga culture *Spongiococcum excentricum*]

| Initial ingredients | | Ingredients fed | | Feeding schedule, days | Total ingredients used | | | Carotene, mg./l.[2] medium | Xanthophyll, mg./l.[2] medium |
| --- | --- | --- | --- | --- | --- | --- | --- | --- | --- |
| Dextrose, percent | CSL,[1] percent | Dextrose, percent | CSL,[1] percent | | Dextrose, percent | CSL,[1] percent | Urea, percent | | |
| 2.0 | 1.5 | 0 | 0 | ----- | 2.0 | 1.5 | 0.3 | 16.45 | 38.0 |
| 3.0 | 1.5 | 0 | 0 | ----- | 3.0 | 1.5 | 0.3 | 17.68 | 54.0 |
| 4.0 | 1.5 | 0 | 0 | ----- | 4.0 | 1.5 | 0.3 | 17.45 | 51.0 |
| 2.0 | 1.5 | 2 | 0 | 3 | 4.0 | 1.5 | 0.3 | 30.46 | 81.5 |
| 5.0 | 1.5 | 0 | 0 | ----- | 5.0 | 1.5 | 0.3 | 22.63 | 62.8 |
| 3.0 | 1.5 | 2 | 0 | 3 | 5.0 | 1.5 | 0.3 | 35.10 | 102.6 |
| 6.0 | 2.5 | 0 | 0 | ----- | 6.0 | 2.5 | 0.4 | 28.8 | 90.9 |
| 3.0 | 1.5 | 3.0 | 1.0 | 3 | 6.0 | 2.5 | 0.4 | 30.0 | 111.9 |
| 9.0 | 3.5 | 0 | 0 | ----- | 9.0 | 3.5 | 0.4 | 25.1 | 89.0 |
| 3.0 | 1.5 | 3.0 / 3.0 | 1.0 / 1.0 | 3 / 5 | 9.0 | 3.5 | 0.4 | 36.6 | 127.8 |
| 12.0 | 3.5 | 0 | 0 | ----- | 12.0 | 3.5 | 0.4 | 0.7 | 2.9 |
| 3.0 | 1.5 | 3.0 / 3.0 / 3.0 | 1.0 / 1.0 / 0 | 3 / 5 / 7 | 12.0 | 3.5 | 0.4 | 34.6 | 144.9 |

[1] Corn steep liquor, 50% solids.
[2] Milligrams per liter.
(The same identification is used throughout.)

Example 2

A series of culture media was prepared containing 1.0, 2.0, 3.0, 4.0, 5.0, 9.0 and 12.0 percent dextrose, and 0.6 to 3.5 percent corn steep liquor. As an additional nitrogen source, 0.3 to 0.4 percent urea was added to the media after sterilization. After the pH was adjusted to 6.8, duplicate flasks of 100 milliliters per 500-milliliter flask of each medium were prepared. After sterilization for 35 minutes at 121° C., urea was added and the flasks inoculated with 3.0 percent by volume of a six-day liquid culture of *Spongiococcum excentricum*. The flasks were placed on a rotary shaker for agitation and aeration at a temperature of 28° C. One group of flasks containing 1.0, 2.0, 3.0, 4.0, 5.0, 9.0 and 12.0 percent dextrose was incubated nine days with no supplemental dextrose. The remainder of the flasks were supplemented with 2.0 to 9.0 percent dextrose and 1.0 to 2.0 percent corn steep liquor at various intervals, as in Example 1. All fermentations were terminated at nine days. Carotene and xanthophyll determinations made on the centrifuged cells are shown in Table 2.

TABLE 2

[The effect of feeding additional dextrose to the medium during the fermentation period upon carotenoid production by alga culture *Spongiococcum excentricum*]

| Initial Ingredients | | Ingredients fed | | Feeding schedule, days | Total ingredients used | | | Carotene, mg./l. medium | Xanthophyll, mg./l. medium |
|---|---|---|---|---|---|---|---|---|---|
| Dextrose, percent | CSL, percent | Dextrose, percent | CSL, percent | | Dextrose, percent | CSL, percent | Urea, percent | | |
| 1.0 | 0.6 | 0 | 0 | ----- | 1.0 | 0.6 | 0.3 | 11.5 | 27.2 |
| 2.0 | 0.6 | 0 | 0 | ----- | 2.0 | 0.6 | 0.3 | 24.4 | 49.0 |
| 3.0 | 1.5 | 0 | 0 | ----- | 3.0 | 1.5 | 0.3 | 37.2 | 65.2 |
| 1.0 | 1.5 | 1.0 / 1.0 | 0 / 0 | 3 / 6 | 3.0 | 1.5 | 0.3 | 32.3 | 79.3 |
| 4.0 | 1.5 | 0 | 0 | ----- | 4.0 | 1.5 | 0.3 | 37.6 | 67.7 |
| 2.0 | 1.5 | 1.0 / 1.0 | 0 / 0 | 3 / 6 | 4.0 | 1.5 | 0.3 | 33.5 | 87.8 |
| 5.0 | 1.5 | 0 | 0 | ----- | 5.0 | 1.5 | 0.3 | 38.4 | 67.0 |
| 3.0 | 1.5 | 1.0 / 1.0 | 0 / 0 | 3 / 6 | 5.0 | 1.5 | 0.3 | 38.2 | 119.3 |
| 9.0 | 3.5 | 0 | 0 | ----- | 9.0 | 3.5 | 0.4 | 12.1 | 47.5 |
| 3.0 | 1.5 | 3.0 / 3.0 | 1.0 / 1.0 | 3 / 5 | 9.0 | 3.5 | 0.4 | 46.5 | 115.1 |
| 12.0 | 3.5 | 0 | 0 | ----- | 12.0 | 3.5 | 0.4 | 1.3 | 3.1 |
| 3.0 | 1.5 | 3.0 / 3.0 / 3.0 | 1.0 / 1.0 / 0 | 3 / 5 / 7 | 12.0 | 3.5 | 0.4 | 32.4 | 154.0 |

Example 3

A series of culture media was prepared containing 5.0, 6.0, 8.0, 9.0 and 10.0 percent dextrose, and 2.0 percent corn steep liquor. As an additional nitrogen source 0.8 percent urea was added to the media after sterilization. After pH was adjusted to 6.6, duplicate flasks of 100 milliliters per 500-milliliter flask of each medium were prepared. After sterilization for 45 minutes at 121° C., urea was added and the flasks inoculated with 4.0 percent by volume of a two-day liquid culture of Chlorella (sp) TX71105 (University of Texas collection). The flasks were placed on a reciprocating shaker for agitation and aeration at a temperature of 28° C. One group of flasks containing 5.0, 6.0, 8.0, 9.0 and 10.0% dextrose was incubated seven days with no supplemental dextrose. The remainder of the flasks were supplemented with dextrose and corn steep liquor at various intervals. All fermentations were terminated at seven days. Carotene and xanthophyll determinations made on the centrifuged cells are shown in Table 3.

TABLE 3

[The effect of adding dextrose to the medium during the fermentation period upon the growth and carotenoid production by alga culture Chorella (sp.) TX71105]

| Initial Ingredients | | Ingredients fed | | Feeding schedule, days | Total ingredients used | | | Carotene, mg./l. medium | Xanthophyll, mg./l. medium |
|---|---|---|---|---|---|---|---|---|---|
| Dextrose, percent | CSL, percent | Dextrose, percent | CSL, percent | | Dextrose, percent | CSL, percent | Urea, percent | | |
| 5.0 | 2.0 | 0 | 0 | ----- | 5.0 | 2.0 | 0.8 | 8.1 | 51.3 |
| 6.0 | 2.0 | 0 | 0 | ----- | 6.0 | 2.0 | 0.8 | 12.7 | 56.9 |
| 8.0 | 2.0 | 0 | 0 | ----- | 8.0 | 2.0 | 0.8 | 4.7 | 51.7 |
| 9.0 | 2.0 | 0 | 0 | ----- | 9.0 | 2.0 | 0.8 | 4.5 | 60.4 |
| 10.0 | 2.0 | 0 | 0 | ----- | 10.0 | 2.0 | 0.8 | 3.7 | 34.3 |
| 4.0 | ----- | 3.0 / 3.0 | 1.0 / 1.0 | 4 / 6 | 10.0 | 3.5 | 0.8 | 11.4 | 108.7 |
| 4.0 | ----- | 3.0 / 3.0 | 1.0 / 1.0 | 3 / 5 | 10.0 | 3.5 | 0.8 | 17.1 | 143.7 |

Example 4

A series of culture media was prepared containing 5.0, 7.0, 9.0, 10.0 and 12.0 percent dextrose and 2.0 percent corn steep liquor. As an additional nitrogen source, 0.8 percent urea was added to the media after sterilization. After pH was adjusted to 6.6, duplicate flasks of 100 milliliters per 500-milliliter flask of each medium were prepared. After sterilization for forty-five minutes at 121° C., urea was added and the flasks inoculated with 4.0 percent by volume of a two-day liquid culture of Chlorella (sp) TX71105 (University of Texas collection). The flasks were placed on a reciprocating shaker for agitation and aeration at a temperature of 28° C. One group of flasks containing 5.0, 7.0, 9.0, 10.0 and 12.0 percent dextrose was incubated seven days with no supplemental dextrose. The remainder of the flasks were supplemented with dextrose and corn steep liquor at various intervals. All fermentations were terminated at seven days.

TABLE 4

[The effect of adding dextrose to the medium during the fermentation period upon the growth and carotenoid production by alga culture Chlorella (sp.) TX71105]

| Initial Ingredients | | Ingredients fed | | Feeding schedule, days | Total ingredients used | | | Carotene, mg./l. medium | Xanthophyll, mg./l. medium |
|---|---|---|---|---|---|---|---|---|---|
| Dextrose, percent | CSL, percent | Dextrose, percent | CSL, percent | | Dextrose, percent | CSL, percent | Urea, percent | | |
| 5.0 | 2.0 | 0 | 0 | ----- | 5.0 | 2 | 0.8 | 5.7 | 30.8 |
| 7.0 | 2.0 | 0 | 0 | ----- | 7.0 | 2 | 0.8 | 9.2 | 30.8 |
| 9.0 | 2.0 | 0 | 0 | ----- | 9.0 | 2 | 0.8 | 6.6 | 49.9 |
| 10.0 | 2.0 | 0 | 0 | ----- | 10.0 | 2 | 0.8 | 5.1 | 28.7 |
| 12.0 | 2.0 | 0 | 0 | ----- | 12.0 | 2 | 0.8 | 4.1 | 34.2 |
| 4.0 | 1.5 | 3.0 / 3.0 | 1.0 / 1.0 | 4 / 6 | 10.0 | 3.5 | 0.8 | 13.5 | 95.7 |
| 4.0 | 1.5 | 3.0 / 3.0 | 1.0 / 1.0 | 4 / 6 | 10.0 | 3.5 | 0.8 | 12.0 | 119.2 |

Example 5

A series of culture media was prepared containing 4.0, 6.0, 8.0 and 10.0 percent dextrose and 2.0 percent corn steep liquor. As an additional nitrogen source, 0.3 percent urea was added to the media after sterilization. After pH was adjusted to 7.0, duplicate flasks of 100 milliliters per 500-milliliter flask of each medium were prepared. After sterilization for 35 minutes at 121° C., urea was added and the flasks inoculated with 3.0 percent by volume of a two-day liquid culture of Chlorella. The flasks were placed on a rotary shaker for agitation and aeration at a temperature of 28° C. One group of flasks containing 4.0, 6.0, 8.0 and 10.0 percent dextrose was incubated seven days with no supplemental dextrose. The remaining flasks were supplemented with 3.0 percent dextrose and 0.75 percent corn steep liquor at various intervals. All fermentations were terminated at seven days. Carotene and xanthophyll determinations made on the centrifuged cells are shown in Table 5.

TABLE 5

[The effect of feeding dextrose to the medium during the fermentation period upon the growth and carotenoid production by alga culture Chlorella (sp.) 214]

| Initial Ingredients | | Ingredients fed | | Feeding schedule, days | Total ingredients used | | | Carotene, mg./l. medium | Xanthophyll, mg./l. medium |
|---|---|---|---|---|---|---|---|---|---|
| Dextrose, percent | CSL, percent | Dextrose, percent | CSL, percent | | Dextrose, percent | CSL, percent | Urea, percent | | |
| 4.0 | 2.0 | 0 | 0 | ----- | 4.0 | 2.0 | 0.3 | 9.0 | 51.7 |
| 6.0 | 2.0 | 0 | 0 | ----- | 6.0 | 2.0 | 0.3 | 7.5 | 77.9 |
| 8.0 | 2.0 | 0 | 0 | ----- | 8.0 | 2.0 | 0.3 | 12.0 | 82.7 |
| 10.0 | 2.0 | 0 | 0 | ----- | 10.0 | 2.0 | 0.3 | 7.5 | 63.6 |
| 6.0 | 2.0 | 3.0 / 3.0 | 0.75 / 0.75 | 2 / 3 | 12.0 | 3.5 | 0.3 | 8.0 | 103.9 |
| 6.0 | 2.0 | 3.0 / 3.0 | 0.75 / 0.75 | 2 / 3 | 12.0 | 3.5 | 0.3 | 9.0 | 102.9 |

Example 6

A series of culture media was prepared containing 4.0, 6.0, 8.0 and 10.0 percent dextrose and 2.0 percent corn steep liquor. As an additional nitrogen source, 0.3 percent urea was added to the media after sterilization. After pH was adjusted to 7.0, duplicate flasks of 100 milliliters per 500-milliliter flask of each medium were prepared. After sterilization for 35 minutes at 121° C., urea was added and the flasks inoculated with 3.0 percent by volume of a six-day liquid culture of *Coccomyxa elongata*. The flasks were placed on a rotary shaker for agitation and aeration at a temperature of 28° C. One group of flasks containing 4.0, 6.0, 8.0 and 10.0 percent dextrose was incubated nine days with no supplemental dextrose. The remaining flasks were supplemented with 2.0 or 3.0 percent dextrose and 1.0 percent corn steep liquor at various intervals. All fermentations were terminated at nine days. Carotene and xanthophyll determinations made on the centrifuged cells are shown in Table 6.

TABLE 6

[The effect of feeding dextrose to the medium during the fermentation period upon the growth and carotenoid production by alga culture *Coccomyxa elongata*]

| Initial Ingredients | | Ingredients fed | | Feeding schedule, days | Total ingredients used | | | Carotene, mg./l. medium | Xanthophyll, mg./l. medium |
|---|---|---|---|---|---|---|---|---|---|
| Dextrose, percent | CSL, percent | Dextrose, percent | CSL, percent | | Dextrose, percent | CSL, percent | Urea, percent | | |
| 4.0 | 2.0 | 0 | 0 | ----- | 4.0 | 2.0 | 0.3 | 4.5 | 49.8 |
| 6.0 | 2.0 | 0 | 0 | ----- | 6.0 | 2.0 | 0.3 | 5.3 | 37.4 |
| 8.0 | 2.0 | 0 | 0 | ----- | 8.0 | 2.0 | 0.3 | 6.0 | 27.0 |
| 10.0 | 2.0 | 0 | 0 | ----- | 10.0 | 2.0 | 0.3 | 0 | 12.7 |
| 6.0 | 2.0 | 2.0 / 2.0 | 1.0 / 1.0 | 4 / 6 | 10.0 | 4.0 | 0.3 | 19.6 | 158.6 |
| 6.0 | 2.0 | 3.0 / 3.0 | 1.0 / 1.0 | 4 / 6 | 12.0 | 4.0 | 0.3 | 16.2 | 156.2 |

Example 7

Two 100-gallon deep tank fermentors were set with 50 gallons of medium consisting of 6.0 percent dextrose, 2.0 percent corn steep liquor, 0.2 percent sodium acetate, and 0.1 percent antifoam FD 62. After sterilization for one hour at 15 pounds pressure, 121° C., the tanks were cooled and 0.6 percent urea was added aseptically to each tank. The tanks were inoculated with 4.0 percent of a liquid five-day culture of Chlorella (sp) TX71105 and allowed to incubate under agitation (100 r.p.m.) and aeration (7.5 c.f.m.) at 28° C. Tank No. 1 was fed 2.0 percent dextrose and 1.0 percent corn steep liquor at 50, 70 and 90 hours. Tank No. 2 was fed 2.0 percent dextrose and 1.0 percent corn steep liquor at 40, 60 and 80 hours. Tank No. 1 was terminated at 200 hours and Tank No. 2 at 160 hours. Xanthophyll deteminations were made on the centrifuged cells. See Table 7 for results.

TABLE 7

The production of xanthophyll by Chlorella (sp) TX71105 in deep tank fermentors using an initial medium consisting of 6.0 percent dextrose, 2.0 percent corn steep liquor, 0.2 percent sodium acetate, 0.6 percent urea, and using dextrose and corn steep liquor feeding.

| Tank No. | Total ingredients used | | | Xantho-phyll, mg./l. medium |
|---|---|---|---|---|
| | Dextrose, percent | CSL, percent | Urea, percent | |
| 1 | 12.0 | 5.0 | 0.6 | 181.0 |
| 2 | 12.0 | 5.0 | 0.6 | 145.6 |

*Example 8*

Two 100-gallon deep tank fermentors were set with 50 gallons of medium to check the production of xanthophyll by *Spongiococcum excentricum*. Medium in Tank No. 1 consisted of 3.0 percent dextrose, 2.0 percent corn steep liquor, 0.004 percent $KH_2PO_4$, 0.004 percent $MgSO_4$, 0.002 percent $CaCl_2$ and 0.01 percent $NH_4NO_3$. Medium in Tank No. 2 consisted of 3.0 percent dextrose, and 2.0 percent corn steep liquor. The tanks were sterilized one hour at 15 pounds pressure, 121° C., cooled, and urea added aseptically. 0.2 percent urea was added to Tank No. 1 and 0.3 percent to Tank No. 2. The tanks were inoculated with 4.0 percent of a liquid six-day culture of *Spongiococcum excentricum*, and allowed to incubate under agitation (100 r.p.m.) and aeration (10 c.f.m.) at 28° C. Tank No. 1 was fed 2.0 percent dextrose, 1.0 percent corn steep liquor at 80, 100 and 120 hours. Tank No. 2 was fed 2.0 percent dextrose, 1.0 percent corn steep liquor at 105, 115 and 135 hours. Tank No. 1 was terminated at 210 hours and Tank No. 2 at 200 hours. Xanthophyll determinations were made on the centrifuged cells. See Table 8 for results.

TABLE 8

The production of xanthophyll by *Spongiococcum excentricum* on deep tank fermentors using an initial medium consisting of 3.0 percent dextrose, 2.0 percent corn steep liquor, 0.2 to 0.3 percent urea and mineral salts and using dextrose feeding techniques.

| Tank No. | Total ingredients used | | | Xantho-phyll, mg./l. medium |
|---|---|---|---|---|
| | Dextrose, percent | CSL, percent | Urea, percent | |
| 1 | 9.0 | 5.0 | 0.4 | 180.6 |
| 2 | 9.0 | 5.0 | 0.4 | 145.6 |

In the foregoing experiments the carbohydrate utilized was dextrose; however, other carbohydrates of the type previously set forth may also be utilized to good advantage and in the production of high yields of carotenoids. As may be seen from the foregoing experiments, the process of the present invention results in the production of enhanced yields of carotene and xanthophyll by efficient and economical means. For example, in Table 1 of Example 1 it will be noted that by means of the process of the present invention rather substantial yields of carotene and xanthophyll are obtained by the feeding of carbohydrate into the nutrient medium during the fermentation period. Thus in the last set of figures in that table we note that 12 percent carbohydrate introduced at the initiation of the fermentation process resulted in a severe inhibition in the production of carotene and xanthophyll, whereas an aggregate of 12 percent, introduced as a 3 percent initial concentration and 9 percent over the fermentation period, produced considerably enhanced yields of these products. The other examples and experiments show similar benefits.

It will be appreciated that the carotenoids produced by the algae may be separated from the cells in accordance with conventional processes which may or may not involve solvent extraction. They are useful for incorporation into animal feeds either as coloring materials or other purposes known to the art. If desired, the algae cells themselves containing the high carotene and xanthophyll concentrations may be advantageously added directly to an animal feed, particularly poultry feeds.

In the foregoing specific examples it has been shown that the feeding of both carbohydrate and proteinaceous material serves to enhance carotenoid production. However, further improved yields of carotenoids are obtained if the urea is also periodically fed to the medium during fermentation. In such instance the initial concentrations of urea is preferably between about 0.05 and 4 percent by weight on a dry basis, and preferably the urea is added so that the concentration in the medium at any one time remains above about 0.2 percent and below about 2.0 percent by weight. The following example demonstrates the effectiveness of feeding urea during the fermentation.

*Example 9*

A culture medium was prepared containing 3.0 percent dextrose and 1.5 percent corn steep liquor. The medium was adjusted to pH 6.8 and triplicate flasks of 100 ml. per 500 ml. flask were prepared. After sterilization for 35 minutes at 121° C., the flasks were cooled, 0.4 percent urea added to each and inoculated with 3.0 percent by volume of a five day liquid culture of *Spongiococcum excentricum*. The flasks were placed on a rotary shaker for aeration and agitation at 28° C. for a nine day incubation period. All flasks were supplemented with 3.0 percent dextrose and 1.0 percent corn steep liquor at 3, 4, 5, 6 and 7 days. One series of flasks, series 1, had no urea supplement. One series (series 2) was supplemented with 0.4 percent urea at five days and one series (series 3) was supplemented with 0.4 percent urea at 5 and again at 7 days. The effect on carotene and xanthophyll is shown in the following table:

TABLE 9

| Series No. | Carotene, mg./liter medium | Xantho-phyll, mg./liter medium |
|---|---|---|
| 1 | 39.6 | 196.8 |
| 2 | 48.6 | 241.0 |
| 3 | 51.9 | 294.1 |

While several particular embodiments of this invention are suggested above, it will be understood, of course, that the invention is not to be limited thereto since many modifications may be made and it is contemplated therefore, by the appended claims, to cover any such modifications as fall within the true spirit and scope of this invention.

What is claimed is:

1. A process for the production of carotenoids which comprises cultivating, at a temperature of from 10 to 40° C. and a pH of from 5.4 to 9 under heterotrophic conditions, a green alga of the division Chlorophyta and of the genus selected from the group consisting of Chlorella, Chlorococcum, Spongiochloris, Spongiococcum, and Coccomyxa in an aqueous organic nutrient medium comprising a proteinaceous material, from 0.05 to 4 percent urea and initially up to about 9 percent by weight (dry basis) carbohydrate, said process being further characterized in the further addition of carbohydrate to said nutrient medium during the cultivation to maintain the concentration thereof at from about 0.5 to about 6.0 percent (dry basis) and wherein the aggregate carbohydrate used in the nutrient during the cultivation is from about 4 to 30 percent by weight (dry basis).

2. A process for the production of carotenoids which comprises cultivating, at a temperature of from 10 to 40° C. and a pH of from between about 5.4 and 9.0, a green alga of the division Chlorophyta and of the genus selected from the group consisting of Chlorella, Chlorococcum, Spongiochloris, Spongiococcum and Coccomyxa in an aqueous organic nutrient medium comprising a proteinaceous material, from 0.05 to 4 percent urea and initially from 0.5 to 6 percent carbohydrate, said process being further characterized in the further addition of carbohydrate to said nutrient medium during the cultivation to maintain the concentration thereof at from about 0.5 to about 5.0 percent by weight (dry basis) and wherein the aggregate carbohydrate used in the nutrient during the cultivation is from about 4 to about 15 percent by weight (dry basis).

3. A process according to claim 1 wherein the carbohydrate is dextrose.

4. A process according to claim 1 wherein the carbohydrate is maintained at a concentration of from 0.5 to 8 percent during said cultivation period.

5. A process according to claim 1 wherein the proteinaceous material initially in the nutrient medium is supplemented during the cultivation period to maintain the concentration of proteinaceous material at from 0.1 to 1.5 percent by weight (dry basis).

6. A process according to claim 2 wherein the ratio of the proteinaceous material utilized in the cultivation period is maintained between about 0.25 and 0.8 weight percent of the nutrient medium for each percent of carbohydrate used on a dry weight basis.

7. A process according to claim 2 wherein the carbohydrate is dextrose.

8. A process according to claim 2 wherein the alga is of the genus Chlorella.

9. A process according to claim 2 wherein the alga is of the genus Spongiococcum.

10. A process according to claim 9 wherein the alga is of the species *excentricum*.

11. A process according to claim 2 wherein the alga is of the genus Coccomyxa.

12. A process according to claim 2 wherein the proteinaceous material initially in the nutrient medium is supplemented during the cultivation period to maintain concentration at from 0.1 to 1.5 percent by weight (dry basis).

13. A process for the production of carotenoids which comprises cultivating under heterotrophic conditions a green alga of the division Chlorophyta in an aqueous organic nutrient medium comprising a proteinaceous material, urea and initially up to about 9 percent by weight (dry basis) carbohydrate, said process being further characterized in the further addition of carbohydrate to said nutrient medium during the cultivation to maintain the concentration thereof at from 0.5 to 5.0 percent by weight (dry basis) and the further addition of proteinaceous material to maintain the concentration thereof at from 0.1 to 1.5 percent by weight (dry basis).

14. A process for the production of carotenoids which comprises cultivating under heterotrophic conditions a green alga of the division Chlorophyta in an aqueous organic nutrient medium containing a proteinaceous material, urea and a carbohydrate, said carbohydrate being present initially in an amount of up to 4 percent by weight (dry basis) and supplementing the nutrient medium during the cultivation by the addition of carbohydrate to maintain the concentration thereof at from about 0.5 to about 5.0 percent by weight (dry basis) and the further addition of proteinaceous material to maintain the concentration thereof at from 0.1 to 1.5 percent by weight (dry basis) and wherein said proteinaceous material is maintained at from about 0.25 to 0.8 percent for each percent of carbohydrate on a dry weight basis.

15. The process recited in claim 1 wherein urea is also added to the fermentation medium during cultivation.

16. The process recited in claim 13 wherein urea is also added to the fermentation medium during cultivation.

References Cited in the file of this patent

UNITED STATES PATENTS 2,658,310  Cook _____ Nov. 10, 1953

OTHER REFERENCES

"Algal Culture" (Burlew) published 1953 by Carnegie Institution of Wash. (D.C.) as their Publication 600. Pages 97, 98, 122 through 126, 153, 204, 205, 265, 296 through 302, and 321 relied on.

Pruess et al.: "Studies on the Mass Culture of Various Algae. . . ." Published May 1954, in Applied Microbiology (Magazine) vol. 2, No. 3, pages 125 through 130.

Condensed Chemical Dictionary, Fifth Edition, Published by Reinhold (N.Y.) 1956. Pages 229 and 230 relied on.